United States Patent [19]

Wagner

[11] Patent Number: 5,650,458

[45] Date of Patent: Jul. 22, 1997

[54] WATERBORNE COATING COMPOSITION FOR PAPERBOARD

[75] Inventor: William G. Wagner, Greer, S.C.

[73] Assignee: Morton International, Inc., Chicago, Ill.

[21] Appl. No.: 613,706

[22] Filed: Mar. 11, 1996

[51] Int. Cl.$^6$ .............................. C08R 5/09; C08F 218/18
[52] U.S. Cl. .......................... 524/284; 524/292; 524/293; 524/297; 524/314; 524/522; 524/523
[58] Field of Search ...................... 524/284, 292, 524/293, 297, 522, 523, 314

[56] References Cited

U.S. PATENT DOCUMENTS

| | | | |
|---|---|---|---|
| 3,666,704 | 5/1972 | Keppler et al. | 524/460 |
| 4,179,414 | 12/1979 | Clayton | 510/404 |
| 4,226,752 | 10/1980 | Erickson et al. | 524/460 |
| 4,426,482 | 1/1984 | Kuramoto et al. | 524/812 |
| 4,539,361 | 9/1985 | Siol et al. | 524/460 |
| 4,546,160 | 10/1985 | Brand et al. | 526/320 |
| 4,668,730 | 5/1987 | Iovine et al. | 524/460 |
| 4,826,631 | 5/1989 | Sullivan | 524/440 |
| 4,902,370 | 2/1990 | Dust et al. | 524/314 |
| 5,190,997 | 3/1993 | Lindemann et al. | 524/458 |
| 5,340,870 | 8/1994 | Clinnin et al. | 524/522 |

OTHER PUBLICATIONS

*Encyclopedia of Chemical Technology*, "Blood, Coagulants and Anticoagulants to Cardiovascular Agents," Kirk–Othmer, 4:316–317.

*Primary Examiner*—Paul R. Michl
*Assistant Examiner*—Olga Asinovsky
*Attorney, Agent, or Firm*—Wayne E. Nacker; Gerald K. White

[57] ABSTRACT

A waterborne composition particularly adapted for coating paperboard is a mixture of a major portion of high-styrene content latex, and minor levels of butyl benzyl phthalate, styrene/butadiene rubber latex and high-acid content styrene/acrylic latex. The coating produced by the composition is hard, glossy, and water-resistant. The components are selected to be fully food-compatible.

2 Claims, No Drawings

WATERBORNE COATING COMPOSITION FOR PAPERBOARD

The present invention is directed to a waterborne composition particularly formulated for coating paperboard and other paper products so as to provide a hard, clear, high-gloss, water-resistant coating.

BACKGROUND OF THE INVENTION

Many paperboard products are coated with a high-gloss coating to provide a high-gloss, water-resistant finish. The finish may be applied merely for aesthetic purposes. In other cases, however, the high-gloss, water resistance serves a very functional purposes, e.g., coatings of paper cups allow them to hold water and other liquids.

Currently, the high-gloss, water-resistant coatings most commonly used for paperboard products, such as paper cups, are wax or polyethylene. These coatings are food-compatible, meeting U.S. government standards and substantially all other government standards for food-contact compatibility. However, a significant drawback of wax and polyethylene are that they render the paper product non-recyclable. Neither wax nor polyethylene coatings are broken down by common pulping bath chemicals and remain as a glob or film when the coated paper product is placed in the pulping bath. Such films or globs tend to interfere with processing of the pulp; thus, paper products coated with polyethylene or waxes are generally rejected for recycling.

Accordingly, it is a general object of the invention to provide a coating for paper products, particularly paperboard, which meets governmental requirements for food contact, particularly those of U.S.C. 21 C.F.R. section 176.170 (Food and Drug Administration), commonly referred to in the industry as 176/170 compliance and which is fully pulpable such that the paper product which is coated may be subsequently recycled.

SUMMARY OF THE INVENTION

In accordance with the invention, there is provided a waterborne composition comprising on a dry solids basis based on total weight of A), B), C), and D)

A) between about 65 and about 80 wt % of a dispersed particles of a resin formed of between about 90 and about 100 wt % styrene monomers and/or alkyl-substituted styrene monomers and between 0 and about 10 wt % acrylic acid or methacrylic acid monomers, the resin having a glass transition temperature of between about 100° and about 115° C., an acid number from 0 to about 8 and particle sizes ranging from about 0.03 to about 8 micron, B) between about 8 and about 15 wt % butyl benzyl phthalate, C) between about 5 and about 15 wt % of dispersed particles of styrene/butadiene rubber wherein styrene monomer comprises between about 20 and about 40 wt % of the rubber and butadiene comprises between about 60 and about 80 wt % of the rubber, the rubber having a glass transition temperature of between about −10° C. and about 10° C., and the rubber particles being about 0.2 microns in diameter or less, D) between about 3 and about 8 wt % of dispersed particles of a resin formed of between about 30 and about 80 wt % styrene monomers and/or alkyl-substituted styrene monomers and between about 20 and about 70 wt % acrylic acid or methacrylic acid monomers, the resin having a glass transition temperature of between about 70° C. and about 130° C., and an acid number from 100 to about 350. The waterborne composition, when coated on paperboard, forms a hard, clear, water-resistant coating having an apparently single glass transition temperature in the range of 60° C. to 80° C., most preferably in the range of about 70° C.

DETAILED DESCRIPTION OF CERTAIN PREFERRED EMBODIMENTS

The major waterborne component of the composition of the present invention is dispersed resin A), a styrene/acrylic resin. Dispersed resin A) is formed primarily from styrene or alkyl-substituted styrene, such as α-methyl styrene, or vinyl toluene, styrene being preferred for this resin. Resin A) may contain a minor amount, preferably at least 2 wt %, of acrylic acid or alkyl-substituted acrylic acid, such as methacrylic acid, giving resin A) a low level of acid functionality, preferably an acid number of at least about 2. A currently preferred waterborne resin A is Lytron® 2203 polystyrene emulsion sold by Morton International, Inc. Other suitable commercial resins include, but are not limited to Dow 722-A and Dow 6687-A. Alternatively, the dispersed resin A) may be synthesized by emulsion polymerization in the presence of suitable soaps and surfactants, including anionic, cationic, and non-ionic surfactants, and initiated by a free-radical generating chemical, such as ammonium persulfate. Emulsion polymerization of α,β-ethylenically monomers is taught, for example, in U.S. Pat. Nos. 5,340,870, 4,826,631, 3,666,704, 4,179,414, 4,226,752, 4,426,482, 4,539,361, 4,546,160 and 4,668,730, the teachings of each of which is incorporated herein by reference.

The dispersed resin A has a relatively high glass transition temperature ($T_g$), i.e., from about 100° to about 115° C., such that when admixed with the other components of the system having lower glass transition temperatures, the coating has a glass transition temperature in the range of about 60°–80° C., preferably in the range of about 70° C.

Butyl benzyl phthalate (Component B)), a food-safe chemical, is believed to act as a plasticizer of the coating which is formed. Butyl benzyl phthalate is commercially available, e.g., as Santicizer® 160 sold by Monsanto Company.

The styrene/butadiene rubber (SBR) (Component C)) helps produce coatings with high gloss and helps to coalesce the composition upon drying. SBR latexes are produced by emulsion polymerization using a free-radical initiator as described in Kirk-Othmar, *Encyclopedia of Chemical Technology*, 3rd Ed., Vol 4, pp. 316–317. Such latexes are commercially available, e.g. Dow CP-620.

Component D), like Component A) is a dispersion of resin containing styrene and acrylic acid monomers, but in this case, a substantially higher proportion of acrylic acid monomers so as to provide a significantly higher acid number, i.e., between about 100 and about 350. This component enhances adhesion strength and water-resistance. A currently preferred acrylic resin is sold as Morez® 101 by Morton International, Inc., and is a terpolymer of 35 wt % α-methylstyrene, 35 wt % styrene, and 30 wt % acrylic acid.

The composition of the present invention is conveniently produced by merely mixing the components A), B), C), and D). Components A), C) and D) are each produced or obtained as separate latexes, each with sufficient surfactants or the like to maintain stable latexes. Additional minor components, such as UV-stabilizers, coalescents, etc. may be added to the water-borne composition. Compositions in accordance with the invention are typically used at solids levels between about 30 and about 60 wt % and at a pH of between about 4 and about 10.

As noted above, the primary purpose of the compositions are as coating on paper products, particularly paperboard which is typically pre-printed. The coating is applied, dried, and heated to about 70° or above.

The resulting finish is clear, hard, and water-resistant. A paper container coated with the finish will retain liquid for from 1 to 20 or more hours.

The coating which is produced after the composition is dried and heated appears to be an "alloy", exhibiting a single apparent glass transition temperature in the 60°–80° C. range.

While the coating of the invention is primarily directed to coating paper, it can be used in other applications, as well, such as coating metal by a coil-coating process or as a heat seal.

The invention will now be described in greater detail by way of specific example.

EXAMPLE

A waterborne composition was formulated as follows with the components expressed as dry parts. Solids level was 48 wt %, pH 9.0–9.5.

| Component | Description | Weight % |
|---|---|---|
| Lytron ® Mix | styrene/methacrylic latex (predominantly styrene) | 73.2 |
| Santicizer ® 160 | Butyl benzyl phthalate | 12.0 |
| Dow ® Cp-620 | Styrene/butadiene rubber latex | 9.6 |
| Morez ® 100 | Styrene/acrylic latex (predominantly acrylic acid) | 5.2 |
| | | 100.0 |

This composition was coated on white paperboard, dried, and heated to 85° C. Properties of the composition were as follows:

| Property | Value |
|---|---|
| Viscosity, cps | 50.0 |
| Coat Wt., lbs/100 ft² | 4.5 |
| Gloss | 66.7 |
| Cobb Sizing, g/m² | 0.1 |
| Color Stain | 1.0 |
| Blocking | 1.0 |

It is to be noted that Color Stain and Blocking represent the best that can be measured.

What is claimed is:

1. A waterborne composition comprising

A) between about 65 and about 80 wt % of dispersed particles of a resin formed of between about 90 and about 100 wt % styrene monomers and/or alkyl-substituted styrene monomers and between 0 and about 10 wt % acrylic acid or methacrylic acid monomers, said resin having a glass transition temperature of between about 100 and about 115° C., an acid number from 0 to about 8 and particle sizes ranging from about 0.03 to about 8 micron, B) between about 8 and about 15 wt % butyl benzyl phthalate, C) between about 5 and about 15 wt % of dispersed particles of styrene/butadiene rubber wherein styrene monomer comprises between about 20 and about 40 wt % of the rubber and butadiene comprises between about 60 and about 80 wt % of the rubber, said rubber having a glass transition temperature of between about −10° C. and about 10° C., and said rubber particles being about 0.2 microns or less in diameter, D) between about 3 and about 8 wt % of dispersed particles of a resin formed of between about 30 and about 80 wt % styrene monomers and/or alkyl-substituted styrene monomers and between about 20 and about 70 wt % acrylic acid or methacrylic acid monomers, said resin having a glass transition temperature of between about 70° C. and about 130° C., and an acid number from 100 to about 350 said weight percentages being calculated relative to total dry solids weight of components A), B), C), and D).

2. The waterborne composition in accordance with claim 1, being formulated to provide a coating with an apparent single glass transition temperature in the range of 60° C. to 80° C.

* * * * *